J. S. WOOD.
Carbureting Hydrogen Gas.
No. 101,557. Patented April 5, 1870.
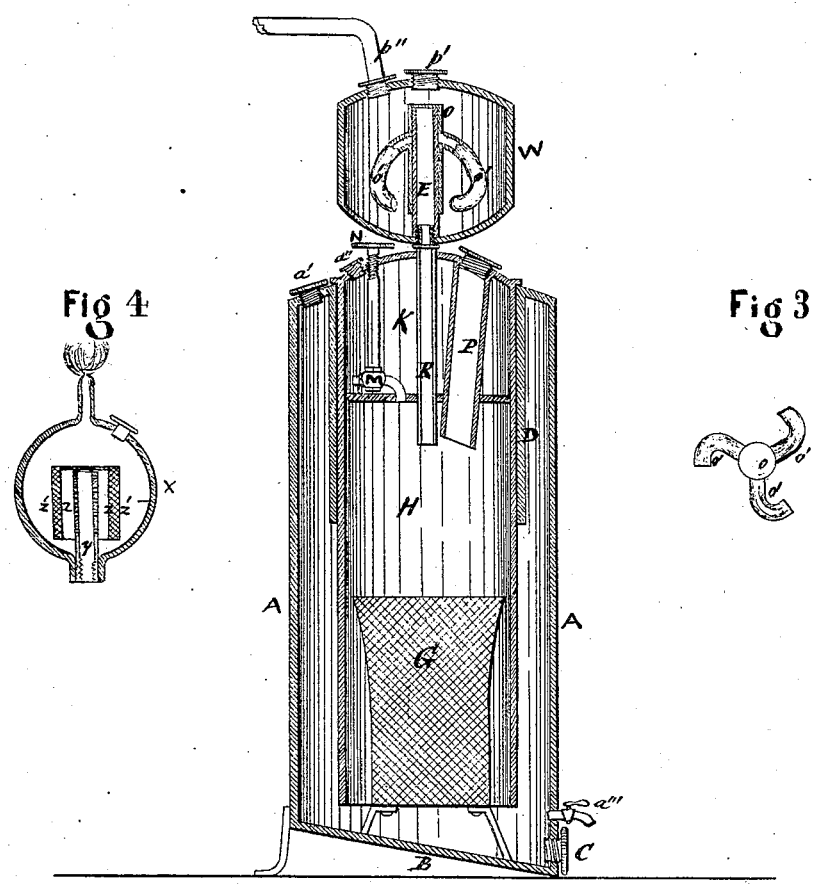
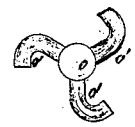
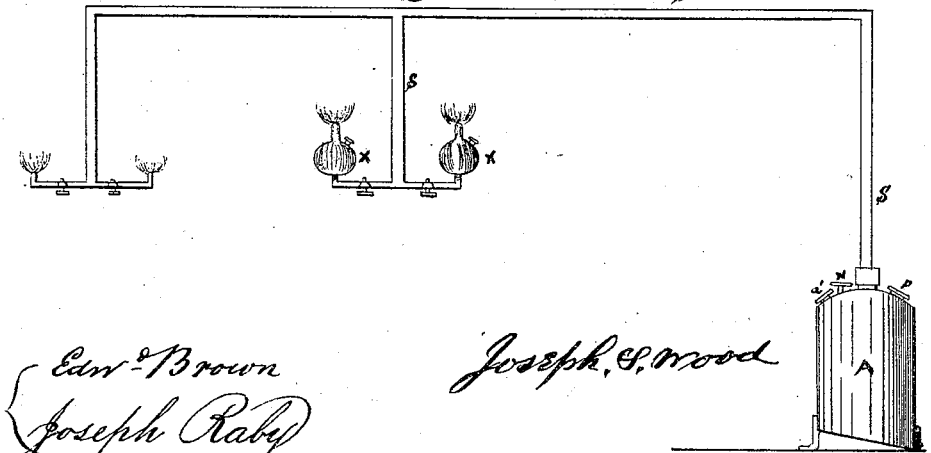
Witnesses: Edw. Brown, Joseph Raby
Joseph S. Wood

UNITED STATES PATENT OFFICE.

JOSEPH S. WOOD, OF PHILADELPHIA, PENNSYLVANIA, ASSIGNOR TO HIMSELF AND JOHN J. CARBERRY, OF SAME PLACE.

IMPROVEMENT IN APPARATUS FOR GENERATING AND CARBURETING HYDROGEN GAS.

Specification forming part of Letters Patent No. 101,557, dated April 5, 1870.

I, JOSEPH S. WOOD, of the city and county of Philadelphia, and State of Pennsylvania, have invented certain Improvements on my patent of December 7th, 1869, for Generating Hydrogen and Hydrocarbon Gas for Illuminating Purposes, of which the following is a specification:

The nature of my invention consists in the construction of the carbureting apparatus, and in the arrangement of it, in combination with the telescopic tube, so as to produce either hydrogen or carbureted-hydrogen gas.

To enable others skilled in the art to make and use my machine, I will now proceed to describe its construction and operation.

Figure 1 is a vertical section through the machine. Fig. 2 shows the general arrangement of the machine, gas-pipes, and lamps. Fig. 3 is a plan of the rotary carbureter for naphthalizing the gas. Fig. 4 is a section through a carbureting-lamp.

A is the cylindrical tank, which contains the dilute sulphuric acid. The bottom B of this tank is made inclined, so that the sediment which collects there by gravity may be drawn off at the valve C at the lowest corner. This tank is united at the top to cylinder D, somewhat smaller in diameter, and extending one-third or one-half of the distance to the bottom, forming an annular space between the cylinders, and also acting as a guide for the telescopic tube H. This tube H passes down into the acid in the tank A and below the basket G containing the iron filings, so as always to make a seal and prevent the escape of gas. In the upper end of the tube H is an acid-reservoir, K, from which the acid in the tank may be replenished from time to time by means of the stop-cock M, operated by the handle N outside of the reservoir. P is a tube passing through the reservoir, by which the iron filings are deposited in the basket G. Another pipe, R, passes up centrally through the reservoir K, through which the hydrogen gas passes either to the gas-pipes or to the carbureting-box W. In the center of this box W rises a tube, E, open at the top above the level of the gasoline contained in the box, but capped with a loose-fitting tube or thimble, O, having two or more arms, O'. The ends of these arms are bent at right angles, as shown in Fig. 3, so that the gas, as it issues from them, causes them to spin around and agitate the gasoline, so as to keep it all at the same density. By this plan the hydrogen is more thoroughly carbonized.

This carbonizer may be used to carbonize atmospheric air in the same manner. The box W is filled through valve $p'$, and the hydrocarbon gas flows off through the pipe $p''$ to the burner.

If this box W is unscrewed and removed from the pipe R, and the gas-pipe S connected direct to the pipe R, as shown at Fig. 2, hydrogen gas would pass direct into the pipes. In this case the hydrogen is carbureted in lamps $x$, near the point of combustion, as shown in Fig. 4. In this lamp the hydrogen passes up the tube $y$ and through a wick between the perforated gage-thimbles $l\ l'$, which are saturated with hydrocarbon oil. It thus becomes carbureted hydrogen, and passes at once to the burners.

The tanks containing the dilute acid should be lined with lead to prevent corrosion.

The tank A is filled with water through valve $a'$, and the reservoir K is filled through valve $a''$.

The cock $a'''$ is for drawing off the liquid from the tank.

The machine regulates the quantity of gas manufactured, as the pressure of gas upon the liquid in the tank forces the liquid up into the annular space and out of contact with the iron filings.

I do not claim the forcing of hydrogen gas through gas-pipes; but

I do claim—

1. The rotary thimble and arms O O' for carbureting gas or air, constructed in the manner herein described.

2. The telescopic tube H, in combination with the tank A for generating hydrogen gas for illuminating purposes, substantially as herein described.

3. The telescopic tube H, in combination with a carbureting-box attached to the outlet-pipe R, substantially as herein described.

JOSEPH S. WOOD.

Witnesses:
 EDWD. BROWN,
 JOS. RABY.